(12) United States Patent
Helgerson et al.

(10) Patent No.: US 12,384,635 B2
(45) Date of Patent: Aug. 12, 2025

(54) ADJUSTABLE TRAY STACKER/DESTACKER ASSEMBLY

(71) Applicant: Automation, Inc., Brooklyn Center, MN (US)

(72) Inventors: David E. Helgerson, Plymouth, MN (US); Reed A. Bailey, Minneapolis, MN (US)

(73) Assignee: Automation, Inc., Brooklyn Center, MN (US)

( * ) Notice: Subject to any disclaimer, the term of this patent is extended or adjusted under 35 U.S.C. 154(b) by 0 days.

(21) Appl. No.: 18/654,574

(22) Filed: May 3, 2024

(65) Prior Publication Data

US 2024/0367925 A1 Nov. 7, 2024

Related U.S. Application Data

(60) Provisional application No. 63/464,088, filed on May 4, 2023.

(51) Int. Cl.
| | |
|---|---|
| *B65G 59/06* | (2006.01) |
| *B65G 57/16* | (2006.01) |
| *B65G 60/00* | (2006.01) |

(52) U.S. Cl.
CPC ......... *B65G 59/063* (2013.01); *B65G 57/165* (2013.01); *B65G 59/061* (2013.01); *B65G 60/00* (2013.01); *B65G 2207/08* (2013.01)

(58) Field of Classification Search
CPC .. B65G 60/00; B65G 47/268; B65G 47/8807; B65G 2201/0258; B65G 2207/08; B65G 59/10; B65G 59/101; B65G 59/102; B65G 59/103; B65G 59/105; B65G 59/106; B65G 59/107; B65G 59/108; B65G 57/165; B65G 59/063; B65G 59/061

USPC ........ 221/241, 242; 414/795.3, 788.2, 795.6, 414/797.4, 798.1

See application file for complete search history.

(56) References Cited

U.S. PATENT DOCUMENTS

| | | | | |
|---|---|---|---|---|
| 3,658,194 A | * | 4/1972 | Gendron .............. | B65G 59/107 |
| | | | | 414/795.8 |
| 3,664,521 A | * | 5/1972 | Feher ..................... | B65B 43/44 |
| | | | | 221/221 |
| 3,895,477 A | * | 7/1975 | Yamashita ........... | B65G 59/062 |
| | | | | 53/252 |
| 5,120,191 A | * | 6/1992 | Coddington ....... | H05K 13/0434 |
| | | | | 271/267 |

(Continued)

*Primary Examiner* — Gregory W Adams
(74) *Attorney, Agent, or Firm* — UB Greensfelder LLP; Brian E. Turung

(57) ABSTRACT

Assemblies, systems, and methods for stacking, destacking, or stacking and destacking a plurality of trays that includes a conveyor having a first rail and a second rail; a lift subassembly configured to stack or destack a plurality of trays having predetermined dimensions, the lift subassembly comprising a first set of arms slidably coupled to a lift plate; a second set of arms slidably coupled to the lift plate; and a bracket configured to slidably couple the lift subassembly to the first rail and the second rail, wherein the first rail, the second rail, or the first and second rails are adjustable along the bracket of the lift subassembly to correspond to the predetermined dimensions of the plurality of trays, and wherein each of the first and second sets of arms are independently adjustable to correspond to the predetermined dimensions of the plurality of trays.

20 Claims, 13 Drawing Sheets

(56) References Cited

U.S. PATENT DOCUMENTS

| | | | | |
|---|---|---|---|---|
| 5,746,571 A * | 5/1998 | Dietschi | ............... | B65H 1/00 |
| | | | | 271/106 |
| 7,641,438 B2 * | 1/2010 | Jaspers | ............ | B65G 47/918 |
| | | | | 221/241 |
| 8,864,437 B1 * | 10/2014 | Flaming | ............ | B65H 29/46 |
| | | | | 414/788.2 |
| 10,384,889 B2 * | 8/2019 | Pryor | .................. | B65B 59/00 |

* cited by examiner

ADJUSTABLE TRAY STACKER/DESTACKER ASSEMBLY

REFERENCED APPLICATIONS

The present patent application claims the benefit of U.S. Provisional Patent Application Ser. No. 63/464,088 filed on May 4, 2023 and entitled "Adjustable Tray Stacker/Destacker", the disclosure of which is hereby incorporated by reference herein in its entirety and made part of the present U.S. utility patent application for all purposes.

TECHNICAL FIELD

The present disclosure relates generally to manufacturing and production systems and processes for stacking/destacking trays and other containers, and more specifically to adjustable apparatuses, systems, and methods for stacking and/or destacking trays and containers of different sizes and dimensions.

BACKGROUND OF DISCLOSURE

Using machines to stack and destack trays and other containers are well known in the art. Such stackable containers may be compartmentalized to segregate individual components in known positions or configured to contain loose parts or fluids. Focused industries have developed standardized parts trays used across multiple processes, including, for example, Society for Laboratory Automation and Screening (SLAS) standard microplates for pharmaceutical and biological fluid handling, Joint Electron Device Engineering Council (JEDEC) standard trays for small electronics assembly, and stackable optical trays used for eyeglass lens processing. Other industries use trays which are of a common construction but custom-sized for each application. These are often variously described as trays, pallets, boats, carriers, frames, etc. Assembly parts themselves may be shaped such that they are stackable for ease in handling. Prior art stacking/destacking systems and devices offer limited flexibility, as they typically employ built-to-size components and/or are generally configured for use with specific, standardized trays. Examples of prior art tray stackers are illustrated in U.S. Pat. Nos. 7,637,712; 6,846,153; 6,241,458; 4,865,515; 4,247,238; 3,718,267; and 3,658,194, which are all fully incorporated by reference herein.

While conventional stacker/destacker systems are effective, the use of built-to-size components and specific, standardized trays increases expense and lowers productivity in the tray stacking/destacking process. For example, if non-standard trays or multiple trays of different sizes and dimensions are to be used, it can be cumbersome and expensive to reconfigure the stacking/destacking systems to accommodate the same.

Accordingly, there remains an ongoing need for an adjustable stacker/destacker assembly that can accommodate different types, sizes, and dimensions of containers and trays.

SUMMARY OF DISCLOSURE

The present disclosure is directed to manufacturing and production systems and processes for stacking/destacking trays and other containers, and more specifically to adjustable apparatuses, systems, and methods for stacking and/or destacking trays and containers of different sizes and dimensions. In particular, the present disclosure is directed to assemblies, systems, and methods for stacking, destacking, or stacking and destacking a plurality of trays that includes a conveyor having a first rail and a second rail; a lift subassembly that is configured to stack or destack a plurality of trays that have predetermined dimensions; and wherein the lift subassembly includes a first set of arms that are slidably coupled to a lift plate; a second set of arms that ae slidably coupled to the lift plate; and a bracket that is configured to slidably couple the lift subassembly to the first rail and the second rail; and wherein the first and/or second rails are adjustable along the bracket of the lift subassembly so as to correspond to the predetermined dimensions of the plurality of trays; and wherein one or both of the first and second sets of arms are independently adjustable to correspond to the predetermined dimensions of the plurality of trays.

In one non-limiting aspect of the present disclosure, there is provided an assembly that includes a conveyor that has a first rail and a second rail; a lift subassembly that is configured to stack or destack a plurality of trays that have predetermined dimensions; and wherein the lift subassembly includes a first set of arms that are slidably coupled to a lift plate; a second set of arms slidably that are coupled to the lift plate; and a bracket that is configured to slidably couple the lift subassembly to the first rail and the second rail; and wherein both the first and second rails are adjustable along the bracket of the lift subassembly so as to correspond to the predetermined dimensions of the plurality of trays; and wherein each of the first and second sets of arms is independently adjustable to correspond to the predetermined dimensions of the plurality of trays.

In another and/or alternative non-limiting aspect of the present disclosure, there is provided an assembly that optionally further includes a second lift subassembly that is configured to stack or destack the plurality of trays; and wherein the second lift subassembly includes a first set of arms that are slidably coupled to a lift plate; a second set of arms that are slidably coupled to the lift plate; and a bracket that is configured to slidably couple the second lift subassembly to the first rail and/or the second rail. In one non-limiting embodiment, the first and/or the second rail can optionally be adjustable along the bracket of the second lift subassembly so as to correspond to the predetermined dimensions of the plurality of trays; and wherein each of the first and second sets of arms of the second lift subassembly may be independently adjustable to correspond to the predetermined dimensions of the plurality of trays.

In another and/or alternative non-limiting aspect of the present disclosure, there is provided an assembly that optionally further includes a first catch-arm subassembly and a second catch-arm subassembly; and wherein the first catch-arm subassembly is slidably coupled to the first rail; and wherein the first catch-arm subassembly includes a catch and a guide member; and wherein a second catch-arm subassembly slidably is coupled to the second rail; and wherein the second catch-arm subassembly includes a catch and a guide member; and wherein the first catch-arm subassembly is adjustable along a length of the first rail; and wherein the second catch-arm subassembly is adjustable along a length of the second rail. In one non-limiting embodiment, the guide member of the first catch-arm subassembly includes a first portion and a second portion that is configured at a predetermined angle to receive a first edge of the plurality of trays; and the guide member of the second catch-arm subassembly includes a first portion and a second portion that is configured at a second predetermined angle to receive a second edge of the plurality of trays. In another and/or alternative embodiment, the first and second catch-arm subassemblies can optionally be configured to correspond to the lift subassembly.

In another and/or alternative non-limiting aspect of the present disclosure, there is provided an assembly that optionally further includes a third catch-arm subassembly and a fourth catch-arm subassembly; and wherein the third catch-arm subassembly is slidably coupled to the first rail; and wherein the third catch-arm subassembly includes a catch and a guide member, and wherein a fourth catch-arm subassembly is slidably coupled to the second rail; and wherein the fourth catch-arm subassembly includes a catch and a guide member; and wherein the third and fourth catch-arm subassemblies are configured to correspond to the second lift subassembly.

In another and/or alternative non-limiting aspect of the present disclosure, there is provided an assembly that optionally further includes a stop-and-crowd subassembly; and wherein the stop-and-crowd subassembly includes a bracket slidably that is coupled to the first and second rails; wherein the bracket includes at least one stop device that is configured to stop each of the plurality of trays at a predetermined location on the conveyor; and wherein the crowder is configured to secure each of the plurality of trays at the predetermined location; and wherein a sensor is communicatively coupled to the at least one stop and/or the crowder. In another and/or alternative embodiment, the first and second set of arms of the lift subassembly can include a slot that receives a pin to adjust the first and second set of arms on the lift plate. In another and/or alternative embodiment, the first set of arms of the lift subassembly can extend in different or opposite directions.

In another and/or alternative non-limiting aspect of the present disclosure, there is provided a tray stacking and destacking assembly that includes a conveyor that has a first rail and a second rail; a first lift subassembly that is configured to destack a plurality of trays having predetermined dimensions; and wherein the first lift subassembly includes a first set of arms that are slidably coupled to a first lift plate; a second set of arms that are slidably coupled to the first lift plate; and a bracket that is configured to slidably couple the first lift subassembly to the first rail and the second rail; and a second lift subassembly that is configured to stack the plurality of trays; and wherein the second lift subassembly includes a first set of arms that is slidably coupled to a second lift plate; a second set of arms that is slidably coupled to the second lift plate; and a bracket that is configured to slidably couple the second lift subassembly to the first rail and the second rail; and wherein the first and/or second rails are adjustable along the bracket of the first lift subassembly and the bracket of the second lift subassembly to correspond to the predetermined dimensions of the plurality of trays; and wherein each of the first and second arms of the first lift subassembly and the first and second arms of the second lift subassembly are independently adjustable to correspond to the predetermined dimensions of the plurality of trays.

In another and/or alternative non-limiting aspect of the present disclosure, there is provided a tray stacking and destacking assembly that includes a first catch-arm subassembly that is slidably coupled to the first rail; and wherein the first catch-arm subassembly includes a catch and a guide member; and a second catch-arm subassembly that is slidably coupled to the second rail; and wherein the second catch-arm subassembly includes a catch and a guide member; and wherein the first catch-arm subassembly is adjustable along a length of the first rail; and wherein the second catch-arm subassembly is adjustable along a length of the second rail. In one non-limiting embodiments, the guide member of the first catch-arm subassembly includes a first portion and a second portion that is configured at a predetermined angle to receive a first edge of the plurality of trays; and wherein the guide member of the second catch-arm subassembly includes a first portion and a second portion that is configured at a second predetermined angle to receive a second edge of the plurality of trays. In another and/or alternative non-limiting embodiment, the first and second catch-arm subassemblies are configured to correspond to the first lift subassembly. In another and/or alternative non-limiting embodiment, the tray stacking and destacking assembly includes a third and a fourth catch-arm subassembly; and wherein the third catch-arm assembly is slidably that is coupled to the first rail; and wherein the third catch-arm subassembly includes a catch and a guide member; and wherein the fourth catch-arm subassembly is slidably coupled to the second rail; and wherein the fourth catch-arm subassembly includes a catch and a guide member; and wherein the third and fourth catch-arm subassemblies are configured to correspond to the second lift subassembly. In another and/or alternative non-limiting embodiment, the tray stacking and destacking assembly includes a bracket, a crowder and a sensor; and wherein the bracket is slidably that is coupled to the first and second rails; and wherein the bracket includes at least one stop device that is configured to stop each of the plurality of trays at a predetermined location on the conveyor; and wherein the crowder is configured to secure each of the plurality of trays at the predetermined location; and wherein the sensor is communicatively coupled to the at least one stop and the crowder. In another and/or alternative non-limiting embodiment, the first and second set of arms of the first lift subassembly include a slot that receives a pin to adjust the first and second set of arms on the first lift plate. In another and/or alternative non-limiting embodiment, each of the first and second set of arms of the second lift subassembly include a slot that receives a pin to adjust the first and second set of arms on the second lift plate. In another and/or alternative non-limiting embodiment, the first set of arms of the first lift subassembly extend in different and/or opposite directions; and the first set of arms of the second lift subassembly extend in different and/or opposite directions.

In another and/or alternative non-limiting aspect of the present disclosure, there is provided a tray stacking and destacking assembly that optionally includes a lift plate that is configured to be readily adapted to receive a plurality of trays having predetermined dimensions for stacking or destacking; and wherein the lift plate includes a first set of arms that are slidably coupled to a top surface of the lift plate; and wherein a second set of arms is slidably coupled to the top surface of the lift plate; wherein each of the first and second sets of arms are independently adjustable to correspond to the predetermined dimensions of the plurality of trays; and further includes an adjustable width conveyor that has a first rail and a second rail; and wherein the lift plate is disposed between the first and second rails; and wherein a catch-arm subassembly is configured to aid in the stacking or destacking of the plurality of trays on the lift plate; and wherein the catch-arm subassembly is slidably coupled to and adjustable along the first rail or the second rail.

One non-limiting object of the present disclosure is the provision of an adjustable stacker/destacker assembly that can accommodate different types, sizes, and dimensions of containers and trays.

Another and/or alternative non-limiting object of the present disclosure is the provision of an adjustable stacker/destacker assembly that includes a conveyor that has a first rail and a second rail; a lift subassembly that is configured to stack or destack a plurality of trays having predetermined dimensions; and wherein the lift subassembly includes a first set of arms that are slidably coupled to a lift plate; a second set of arms that are slidably coupled to the lift plate; and a bracket that is configured to slidably couple the lift subassembly to the first rail and the second rail; and wherein the first and/or second rails are adjustable along the bracket of the lift subassembly to correspond to the predetermined dimensions of the plurality of trays; and wherein each of the first and second sets of arms are independently adjustable to correspond to the predetermined dimensions of the plurality of trays.

Another and/or alternative non-limiting object of the present disclosure is the provision of an adjustable stacker/destacker assembly that further includes a second lift subassembly that is configured to stack or destack the plurality of trays; and wherein the second lift subassembly includes a first set of arms that are slidably coupled to a lift plate; a second set of arms that are slidably coupled to the lift plate; and a bracket that is configured to slidably couple the second lift subassembly to the first rail and the second rail.

Another and/or alternative non-limiting object of the present disclosure is the provision of an adjustable stacker/destacker assembly wherein the first and/or second rails are adjustable along the bracket of the second lift subassembly to correspond to the predetermined dimensions of the plurality of trays; and wherein first and/or second sets of arms of the second lift subassembly are independently adjustable to correspond to the predetermined dimensions of the plurality of trays.

Another and/or alternative non-limiting object of the present disclosure is the provision of an adjustable stacker/destacker assembly that further includes a first catch-arm subassembly slidably that is coupled to the first rail; and wherein the first catch-arm subassembly includes a catch and a guide member; and wherein a second catch-arm subassembly is slidably coupled to the second rail; and wherein the second catch-arm subassembly includes a catch and a guide member; and wherein the first catch-arm subassembly is adjustable along a length of the first rail; and wherein the second catch-arm subassembly is adjustable along a length of the second rail.

Another and/or alternative non-limiting object of the present disclosure is the provision of an adjustable stacker/destacker assembly wherein the guide member of the first catch-arm subassembly includes a first portion and a second portion that is configured at a predetermined angle to receive a first edge of the plurality of trays; and wherein the guide member of the second catch-arm subassembly includes a first portion and a second portion that is configured at a second predetermined angle to receive a second edge of the plurality of trays.

Another and/or alternative non-limiting object of the present disclosure is the provision of an adjustable stacker/destacker assembly wherein the first and second catch-arm subassemblies are configured to correspond to the lift subassembly.

Another and/or alternative non-limiting object of the present disclosure is the provision of an adjustable stacker/destacker assembly further including a third and fourth catch-arm; and wherein the third catch-arm subassembly is slidably coupled to the first rail; and wherein the third catch-arm subassembly includes a catch and a guide member; and wherein the fourth catch-arm subassembly is slidably coupled to the second rail; and wherein the four catch-arm subassembly includes a catch and a guide member; and wherein the third and fourth catch-arm subassemblies are configured to correspond to the second lift subassembly.

Another and/or alternative non-limiting object of the present disclosure is the provision of an adjustable stacker/destacker assembly further comprising a stop-and-crowd subassembly; and wherein the stop-and-crowd subassembly includes a bracket, a crowder and a sensor; and wherein the bracket is slidably coupled to the first and second rails; and wherein the bracket includes at least one stop device that is configured to stop each of the plurality of trays at a predetermined location on the conveyor; and wherein the crowder is configured to secure each of the plurality of trays at the predetermined location; and wherein the sensor is communicatively coupled to the at least one stop and/or the crowder.

Another and/or alternative non-limiting object of the present disclosure is the provision of an adjustable stacker/destacker assembly wherein each of the first and second set of arms of the lift subassembly includes a slot that receives a pin to adjust the first and second set of arms on the lift plate.

Another and/or alternative non-limiting object of the present disclosure is the provision of an adjustable stacker/destacker assembly wherein the first set of arms of the lift subassembly extend in different and/or opposite directions.

These and other objects and advantages will become apparent to those skilled in the art upon reading and following the description taken together with the accompanying drawings.

BRIEF DESCRIPTION OF THE DRAWINGS

The accompanying drawings, which are incorporated into and form a part of the specification, schematically illustrate one or more example implementations of the disclosed technology and, together with the general description given above and detailed description given below, serve to explain the principles of the disclosed subject matter, and wherein.

DETAILED DESCRIPTION OF NON-LIMITING EMBODIMENTS

Figure 1:
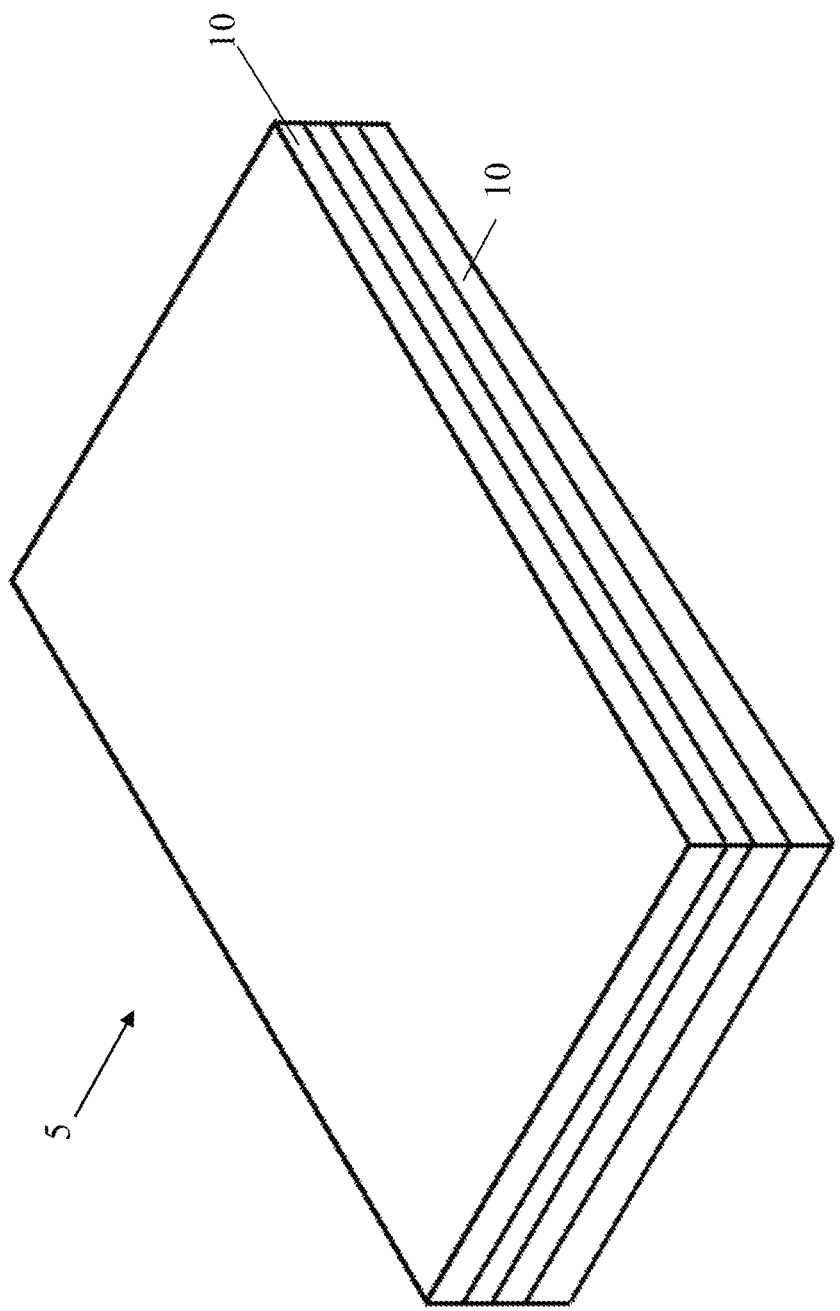
FIG. 1 is a perspective view of an exemplary stack of trays for use with an adjustable stacker/destacker assembly in accordance with the present disclosure.

A more complete understanding of the articles/devices, processes and components disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g., "about 2 to about 4" also discloses the range "from 2 to 4." Generally, the terms "about" and "approximately" may refer to plus or minus 10% of the indicated number.

Percentages of elements should be assumed to be percent by weight of the stated element, unless expressly stated otherwise.

Although the operations of exemplary embodiments of the disclosed method may be described in a particular, sequential order for convenient presentation, it should be understood that disclosed embodiments can encompass an order of operations other than the particular, sequential order disclosed. For example, operations described sequentially may in some cases be rearranged or performed concurrently. Further, descriptions and disclosures provided in association with one particular embodiment are not limited to that embodiment, and may be applied to any embodiment disclosed.

For the sake of simplicity, the attached figures may not show the various ways (readily discernable, based on this disclosure, by one of ordinary skill in the art) in which the disclosed system, method and apparatus can be used in combination with other systems, methods and apparatuses. Additionally, the description sometimes uses terms such as "produce" and "provide" to describe the disclosed method. These terms are abstractions of the actual operations that can be performed. The actual operations that correspond to these terms can vary depending on the particular implementation and are, based on this disclosure, readily discernible by one of ordinary skill in the art.

One or more implementations of the subject application will now be described with reference to the attached FIGS. 1-17, wherein like reference numerals are used to refer to like elements throughout.

Example implementations of the disclosed assemblies, systems, and methods provide a stacker/destacker assembly that can be adjusted to stack, destack, or stack and destack trays and other containers of any shape, size, and dimension, without the need for customized, tray specific components. Although the disclosed assembly and method may be used with more than one type of tray/container, FIG. 1 depicts an exemplary stack of trays 5 formed from trays 10 that are each substantially rectangular. The disclosed assembly can: (i) be adjusted to accommodate the trays 10 having a predetermined size and dimension; and (ii) only destack the stack of trays 5; (iii) only stack the trays 10; or (iv) both stack and destack. As can be appreciated, the number of trays 10 that can be stacked and/or destacked by the stacker/destacker assembly in accordance with the present disclosure is non-limiting. Furthermore, it will be appreciated that the stacker/destacker assembly in accordance with the present disclosure can be used to stack and/or destack trays that have a shape other than a rectangular shape (e.g., square-shape, oval shape, circular shape, polygonal shape, stadium shape, etc.).

Figure 17:
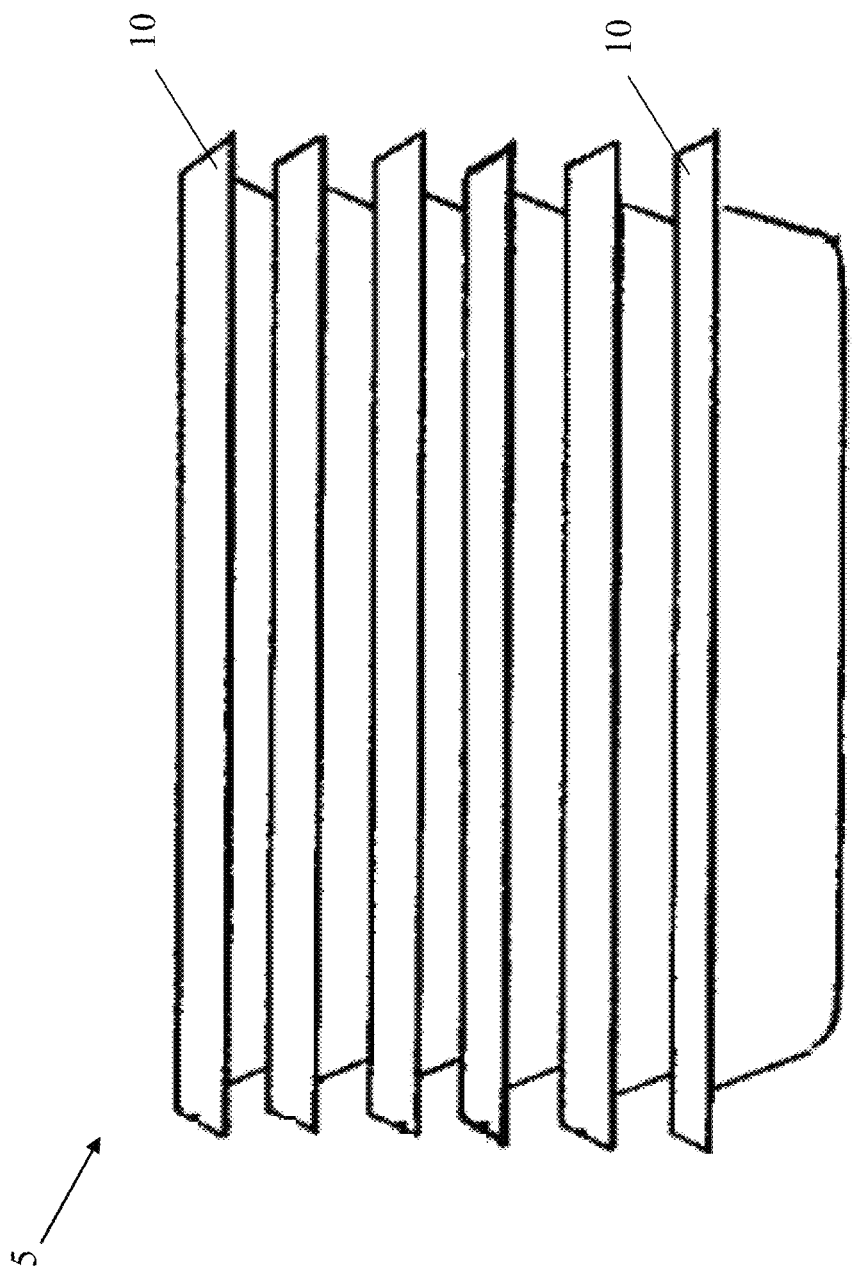
FIG. 17 is a perspective view of another exemplary stack of trays for use with the adjustable stacker/destacker assembly in accordance with the present disclosure.

As shown in FIG. 17, the stack of trays 5 can optionally include nesting features that align the trays 10 with one another and/or an arrangement of bosses and pockets or pins and holes that ease in the handling of the trays 10 for loading and unloading. Furthermore, it will appreciated that the trays 10 can be optionally separated, vertically, from one another in the stack 5 by a specific feature (e.g. bottom skirts or upper lips) on each side of the trays 10 and/or extend around the entire perimeter of the trays 10. Pockets or notches that recess from the perimeter of the trays 10 with enough clearance for the stack 5 catches to hold one tray while vertically releasing a bottom tray may also optionally be used.

Figure 2:
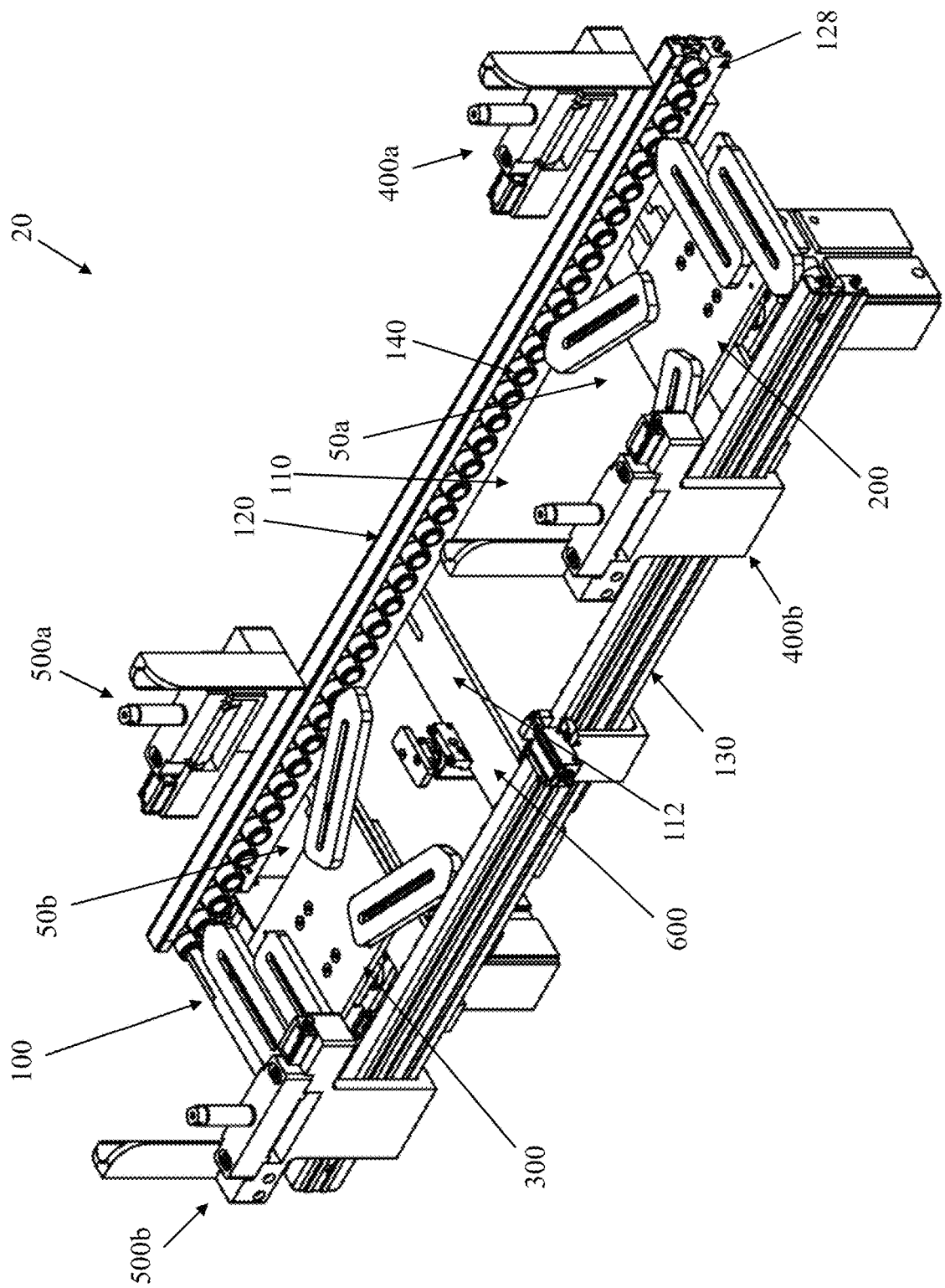
FIG. 2 is a perspective view of a non-limiting embodiment of an adjustable stacker/destacker assembly in a completely assembled configuration in accordance with the present disclosure.
Figure 3:
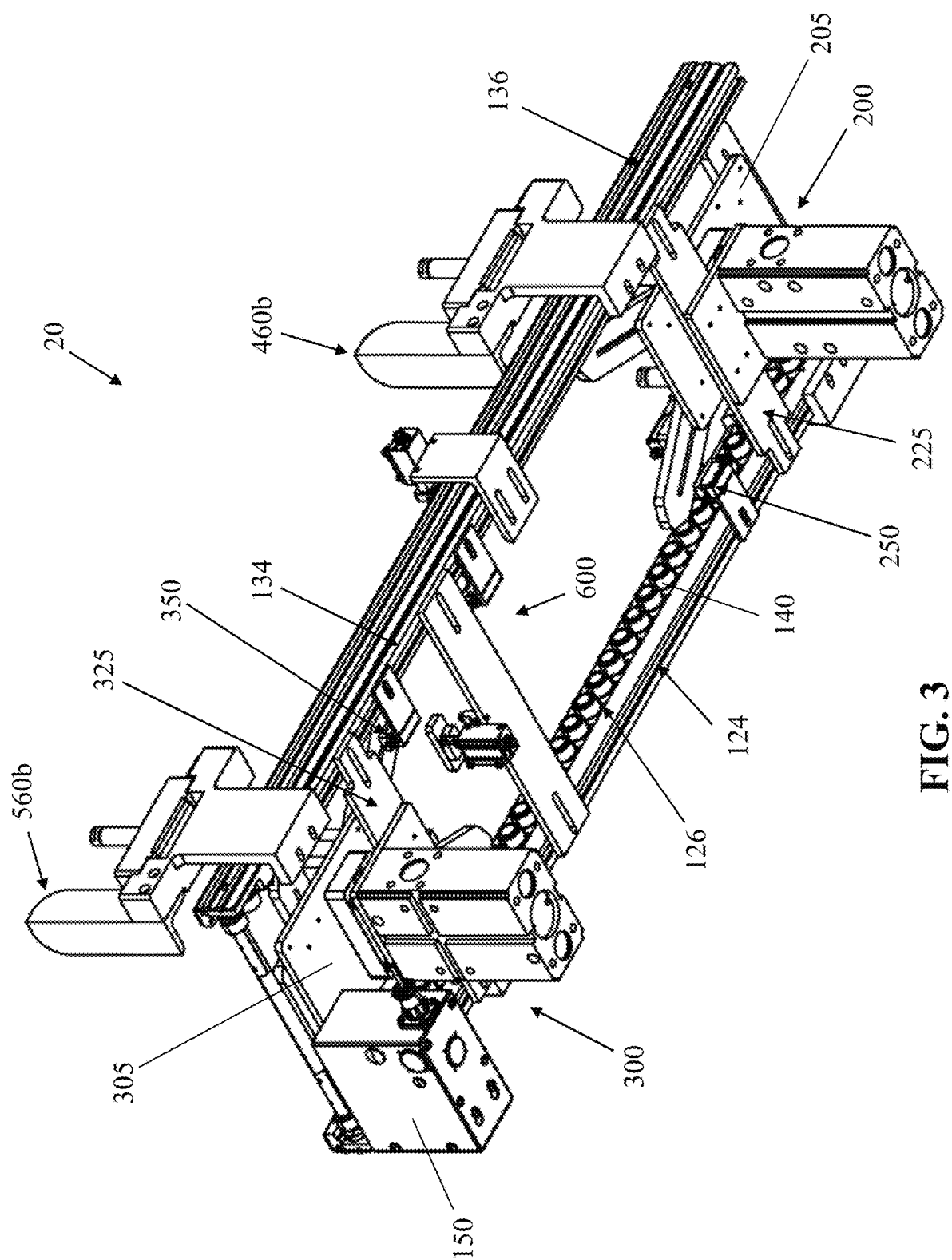
FIG. 3 is a bottom perspective view of the adjustable stacker/destacker assembly of FIG. 2.
Figure 4:
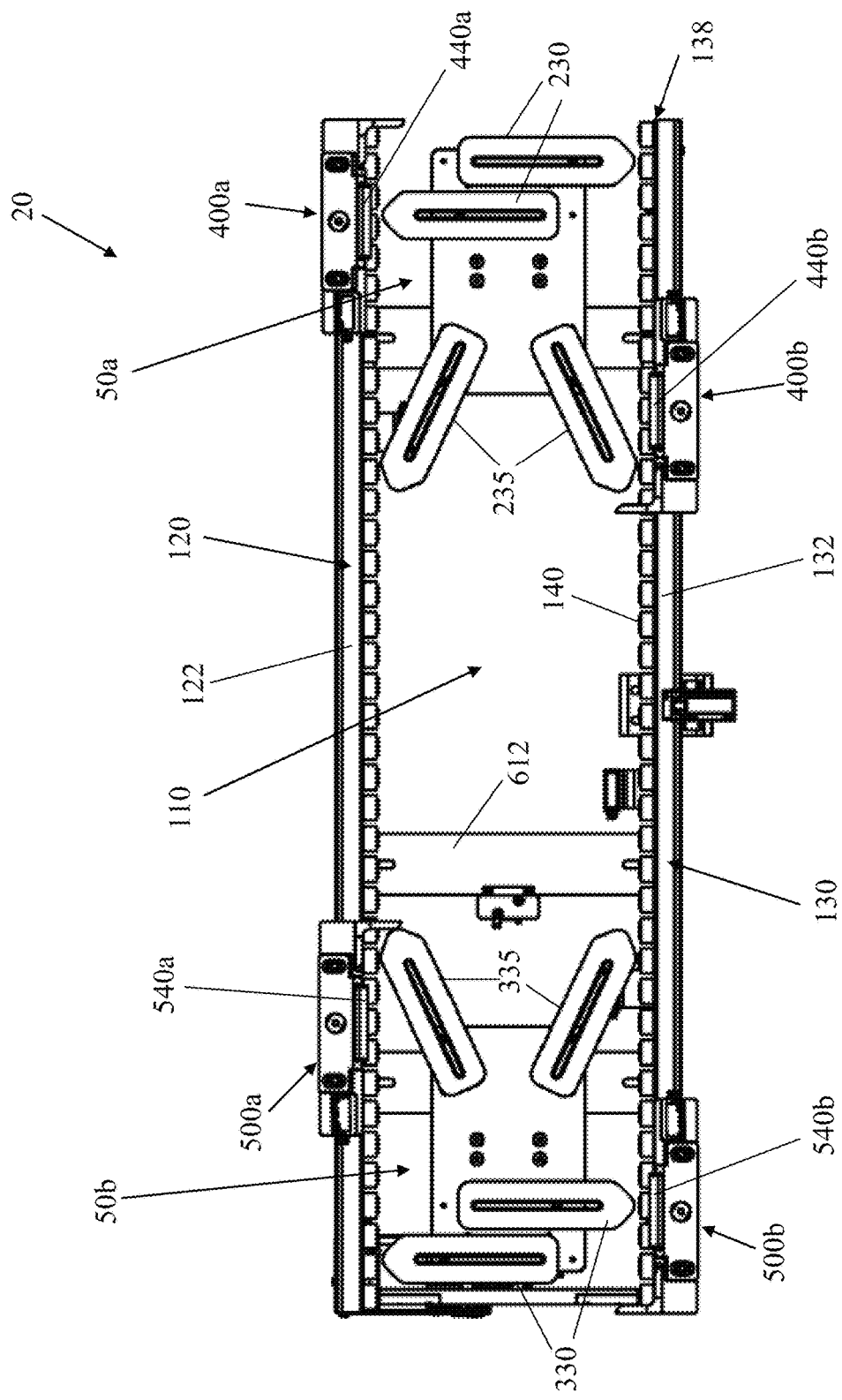
FIG. 4 is a top-down view of the adjustable stacker/destacker assembly of FIG. 2.
Figure 5:
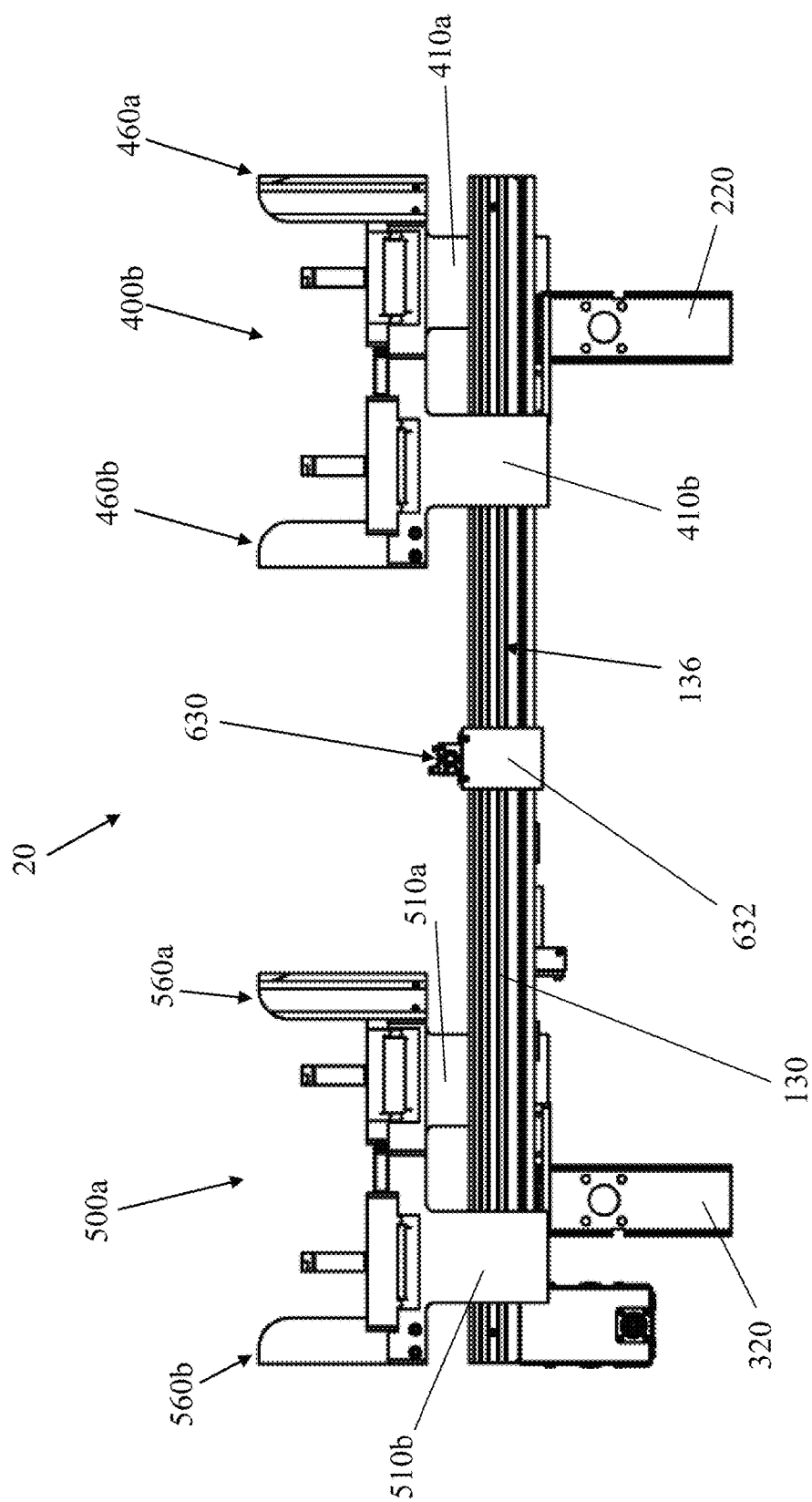
FIG. 5 is a side view of the adjustable stacker/destacker assembly of FIG. 2.
Figure 6:
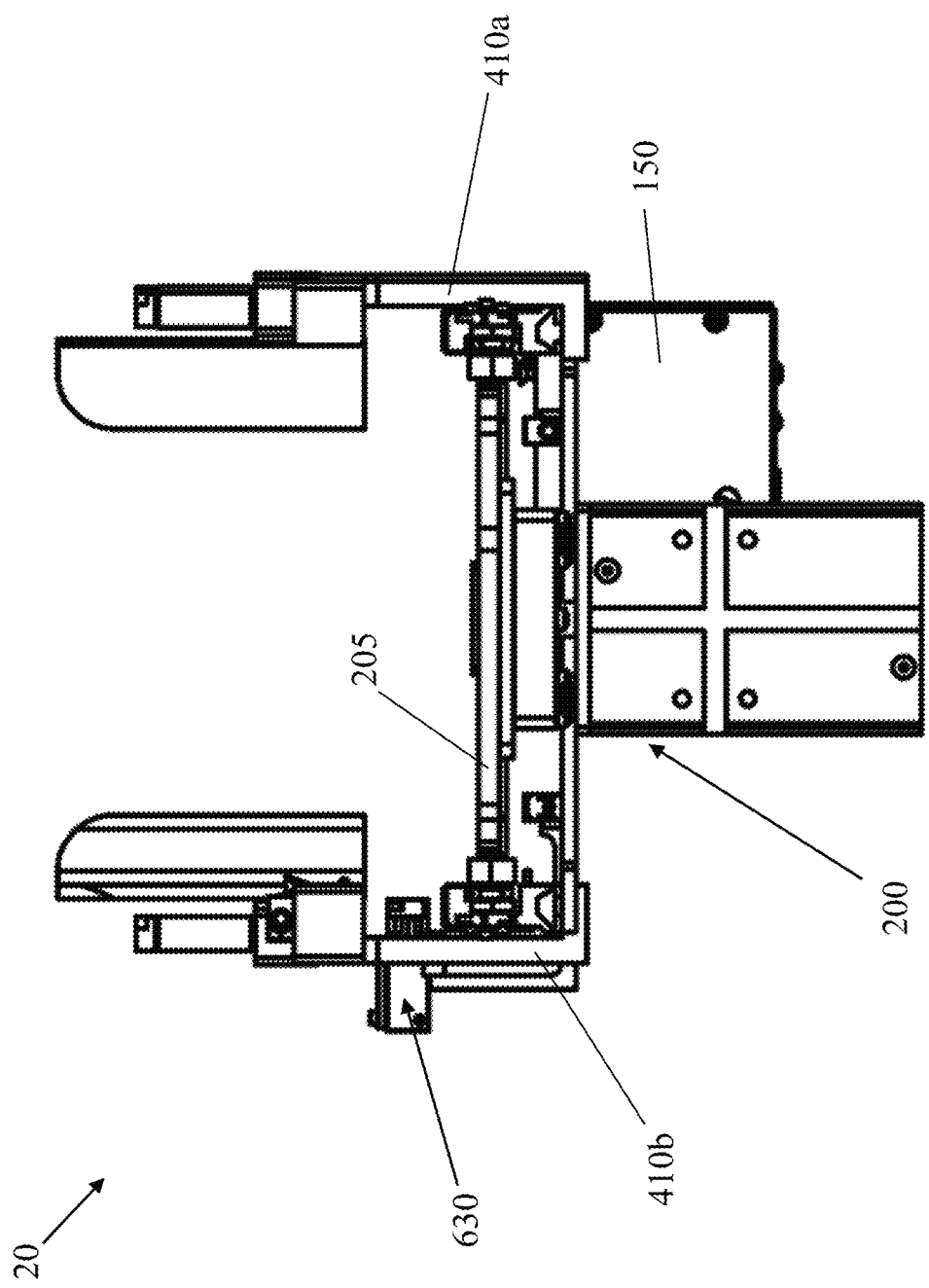
FIG. 6 is a front view of the adjustable stacker/destacker assembly of FIG. 2.

Referring now to FIG. 2, there is illustrated a perspective view of a non-limiting implementation of the adjustable stacker/destacker assembly 20 shown in a completely assembled configuration. FIG. 3 is a bottom perspective view of the adjustable stacker/destacker assembly 20 of FIG. 2. FIG. 4 is a top-down view of the adjustable stacker/destacker assembly 20 of FIG. 2. FIG. 5 is a side view of the adjustable stacker/destacker assembly 20 of FIG. 2. FIG. 6 is a front view of the adjustable stacker/destacker assembly 20 of FIG. 2.

With reference to FIGS. 2-6, exemplary stacker/destacker assembly 20 includes a destacker portion 50a, a stacker portion 50b, and a conveyor 100. The destacker portion 50a includes a first lift subassembly 200 and catch-arm subassemblies 400a, 400b; and the stacker portion 50b includes a second lift subassembly 300 and catch-arm subassemblies 500a, 500b. In the present exemplary embodiment, the stacker/destacker assembly 20 further includes a stop-and-crowd work subassembly 600.

The conveyor 100 includes a track 110 defined by a first rail 120 and a second rail 130, wherein the first rail 120 has top and bottom sides 122, 124 and outer and inner portions 126, 128; and the second rail 130 has top and bottom sides 132, 134 and outer and inner portions 136, 138. The first and second rails 120, 130 are generally positioned parallel to one another along 50-100% (and all values and ranges therebetween) of the longitudinal length of the conveyor 100. A plurality of rollers 140 are formed on the inner portions 128 and 138 of the first rail 120 and the second rail 130, respectively, to aid in transporting the trays or containers 10 to a desired location along the longitudinal length of the conveyor 100. The conveyor 100 further includes a motor 150 that actuates the track 110 in a predetermined direction along the conveyor 100. The motor can be manually and/or computer controlled so as to turn on, turn off and/or to adjust/control speed. The conveyor can optionally include one or more intermediate width supports 112 that are positioned between and generally connected to the first and second rails 120, 130 and which used to increase the strength and rigidity of the conveyor. The one or more intermediate width supports 112 can include one or more slots or other adjustable connection arrangements to facilitate in the adjustment of the width of the conveyor.

In one non-limiting embodiment, the motor 150 actuates the track 110 in a bidirectional manner. In the present non-limiting embodiment, the conveyor 100 is configured as an adjustable-width conveyor, wherein the first and second rails 120, 130 can be moved closer together or further apart from one another to define a predetermined width of the conveyor 100, thereby accommodating the trays 10 having a wide variety of width and dimensions and/or allowing for different orientations of the trays to be positioned and moved on the conveyor 100. In the present non-limiting embodiment, the track 110 is open-centered to allow for easy processing and application of auxiliary devices; however, it is to be understood that the track 110 could include a solid-center formed from transverse rollers, belts, sheets, or the like.

The first lift subassembly 200 and the second lift subassembly 300 are each independently and slidably coupled to the bottom sides 124, 134 of the first and second rails 120, 130. The first and second lift subassemblies 200, 300 are each configured to be positioned between the first and second rails 120, 130. In the present non-limiting embodiment, the catch-arm subassemblies 400a, 500a are each arranged on the outer portion 126 of the first rail 120 and are configured to slidably move along a length, or x-axis, of the first rail 120. In the present non-limiting embodiment, the catch-arm subassemblies 400b, 500b are each arranged on the outer portion 136 of the second rail 130 and are configured to slidably move along a length, or x-axis, of the second rail 130. In the present non-limiting embodiment, the stop-and-crowd work subassembly 600 is slidably coupled to the bottom sides 124, 134 of the first and second rails 120, 130. Each of the first and second lift subassemblies 200, 300, the catch-arm subassemblies 400a, 400b, 500a, 500b, and the stop-and-crowd work subassembly 600 are slidably coupled to their respective rails 120, 130 to accommodate trays and containers of various sizes and dimensions without the need for custom-fabricated, tray-specific components. It will be appreciated, however, that other suitable configurations for the components of the stacker/destacker assembly 20 are possible.

Referring now to FIGS. 7-10, there is illustrated the first lift subassembly 200. The second lift subassembly 300 can be configured similarly to the first lift subassembly 200. In such a configuration, both subassemblies 200, 300 include the same components, but are positionable at opposite ends of the stacker/destacker assembly 20 and function to either destack the trays (e.g. first lift subassembly 200) or stack the trays (e.g. second life subassembly 300). For clarity, the first subassembly 200 will be discussed with reference to FIGS. 7-10. FIGS. 2-5 depict the elements of the second lift subassembly 300, where like reference numerals are used to refer to like elements of the first lift subassembly 200.

Figure 8:
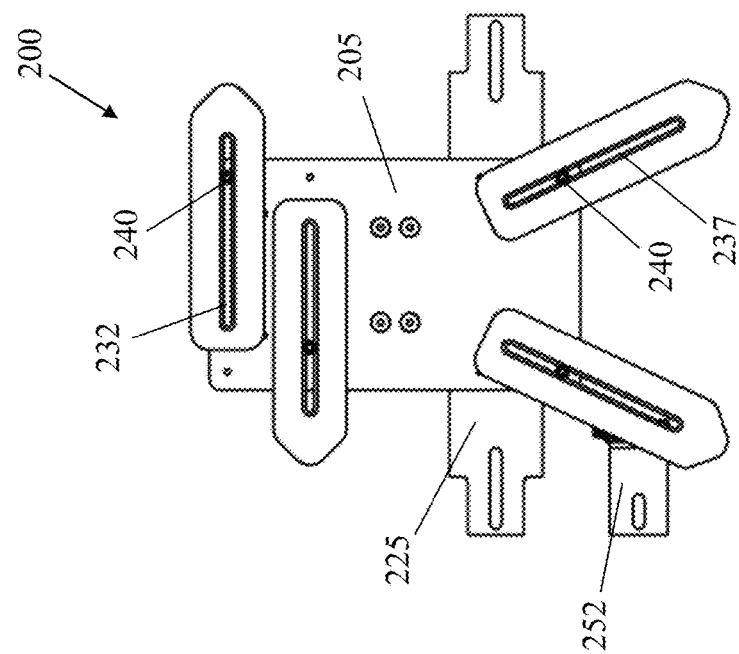
FIG. 8 is a top-down view of the lift subassembly of FIG. 7.
Figure 7:
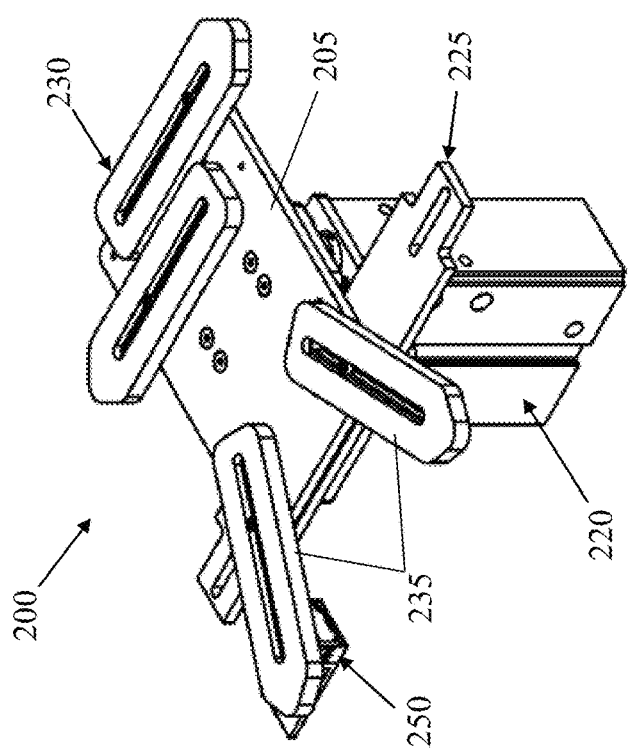
FIG. 7 is a perspective view of a non-limiting lift subassembly of the adjustable stacker/destacker assembly of FIG. 2.
Figure 10:
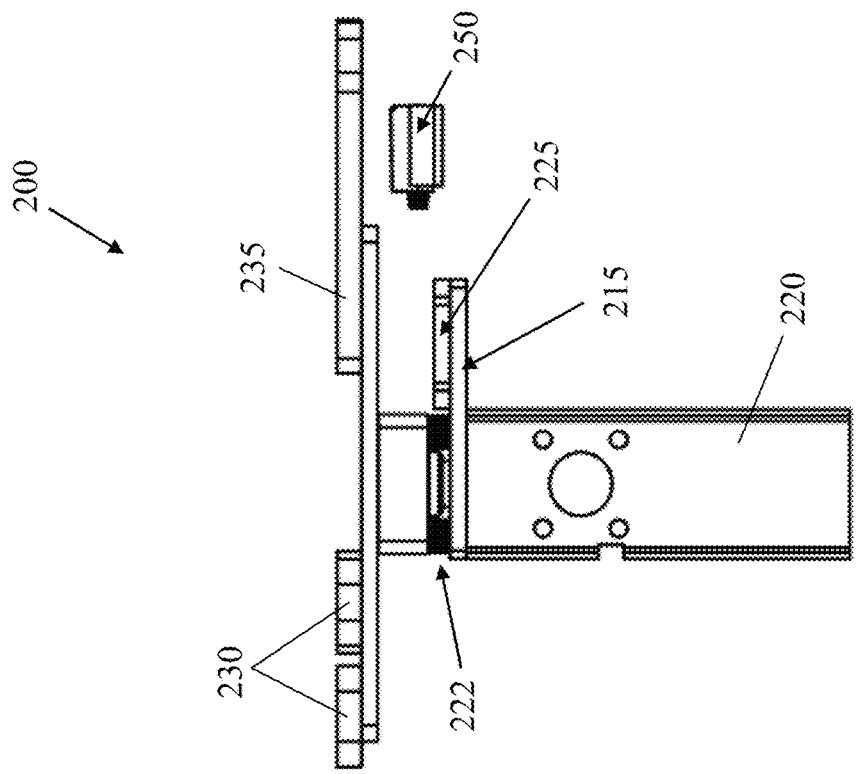
FIG. 10 is a side view of the lift subassembly of FIG. 7.
Figure 9:
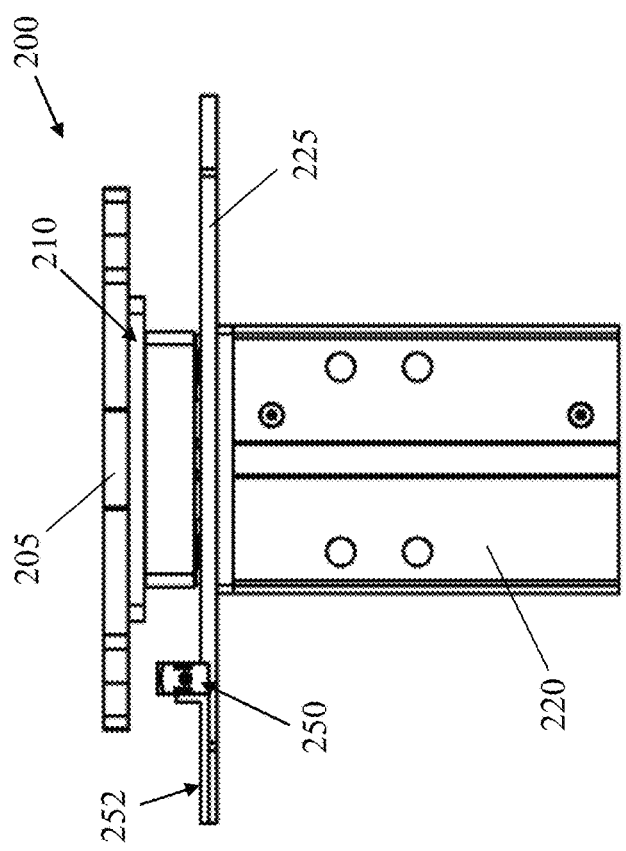
FIG. 9 is a front view of the lift subassembly of FIG. 7.

Referring now to FIG. 7, a perspective view of the first lift subassembly 200 of the adjustable stacker/destacker assembly 20 is illustrated. FIG. 8 illustrates a top-down view of the first lift subassembly 200. FIG. 9 illustrated a front view of the first lift subassembly 200. FIG. 10 illustrated a side view of the first lift subassembly 200. The first lift subassembly 200 includes a lift plate 205 coupled to a base 210. The lift plate 205 includes a first set of adjustable arms 230 that extend in opposite directions; and a second set of adjustable arms 235, wherein each of the adjustable arms 230 include a slot 232 that receives a pin or similar engagement device 240 to slidably couple the first set of adjustable arms 230 to the lift plate 205. The second set of adjustable arms 235 are movable in different directions than the movement direction of the first set of adjustable arms 230.

Each of the adjustable arms 230, 235 include a slot 232, 237 that receives the pin or some other engagement device 240 (e.g., pin, rail, adjustable clamping arrangement, electro-magnetic coupling arrangement, bolt arrangement, screws, etc.) to slidably/movably couple the second set of adjustable arms 235 to the lift plate 205. As can be appreciated, other or additional arrangements can be used to enable adjustable movement of the adjustable arms 230, 235. It is to be appreciated that in some non-limiting embodiments the adjustable arms 230, 235 can be uncoupled from the lift plate 205 to create a simplified lift plate.

The first set of adjustable arms 230 and the second set of adjustable arms 235 are each independently adjustable, either manually or through electronic automation, to form a universal lift plate 205 that can be readily adapted to receive trays having a wide variety of widths, shapes, and dimensions. The adjustable arms 230, 235 ensure accurate placement and positioning of the trays 10 on the lift plate 205 without needing separate, custom-sized lift plates for every sized tray.

The first lift subassembly 200 further includes a lift cylinder 220 having a piston or other similar actuated device 222 configured to raise and lower the lift plate 205. A support plate 215 is coupled to the lift cylinder 220 to support an adjustable width bracket 225. In the present non-limiting embodiment, the first lift subassembly 200 further includes a sensor 250 coupled to a bracket 252, wherein the sensor 250 is configured to detect if a tray 10 is present in the destacker portion 50*a*, to determine the position of the tray 10 in the destacker portion 50*a*, and/or to determine the displacement of the trays on the conveyor 100. In the present non-limiting embodiment, the sensor 250 is coupled to the bottom side 122 of the first rail 120; however, this is not required. The sensor 250 may include photoelectric sensors, optical sensors, cameras, microphones, and/or other sensing devices. The sensor 250 can be connected (wired connection and/or wireless connection) to a controller (not shown) such as, but not limited to, a computer, server, smart device app, etc. so as to monitor and/or control the operation of the first lift subassembly 200.

Figure 12:
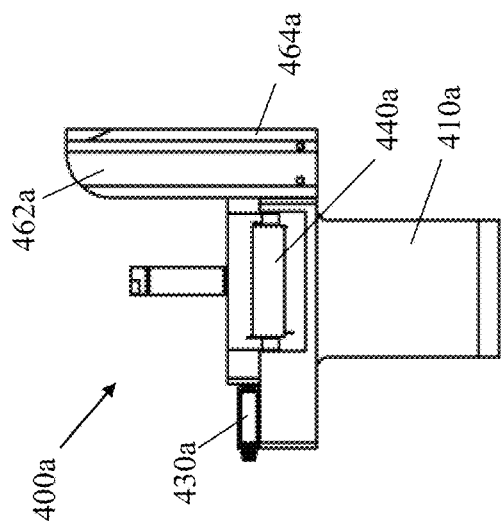
FIG. 12 is a first side view of the catch-arm subassembly of FIG. 11.
Figure 13:
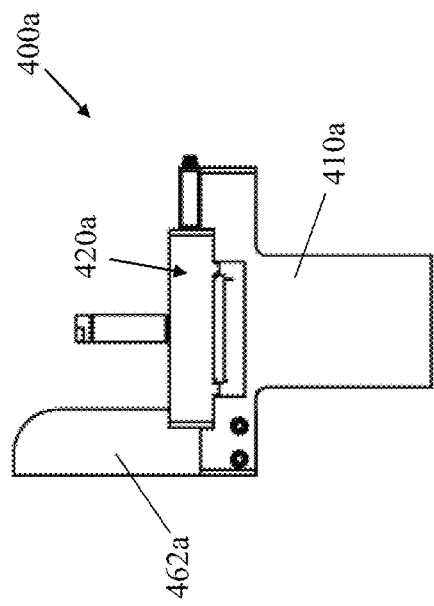
FIG. 13 is a second side view of the catch-arm subassembly of FIG. 11.
Figure 11:
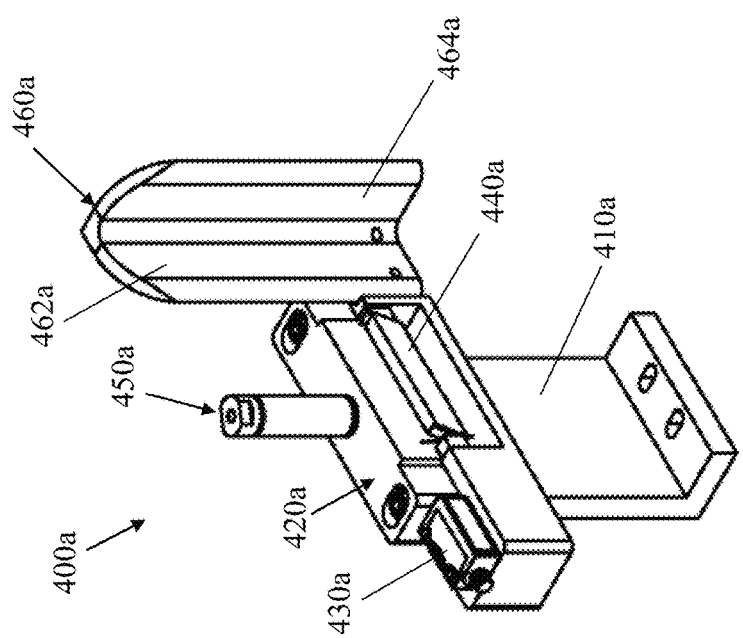
FIG. 11 is a perspective view of a non-limiting catch-arm subassembly of the adjustable stacker/destacker assembly of FIG. 2.

Referring now to FIGS. 11-13, there is illustrated catch-arm subassembly 400*a*; however, it can be appreciated that the catch-arm subassembly illustrated in FIGS. 11-13 can also be representative of catch-arm subassemblies 400*b*, 500*a*, 500*b* since the subassemblies 400*a*, 400*b*, 500*a*, 500*b* include the same components, but are positionable either on different rails 120, 130 and/or in the destacker portion 50*a* or the stacker portion 50*b* of the assembly 20. More specifically, the catch-arm subassembly 500*a* is identical to the catch arm subassembly 400*a*, the difference being that the catch-arm subassembly 400*a* is positioned in the destacker portion 50*a* and the catch arm subassembly 500*a* is positioned in the stacker portion 50*b*. Catch arm subassemblies 400*b* and 500*b* are identical to subassemblies 400*a* and 500*a*, respectively, the difference being that subassemblies 400*b* and 500*b* are coupled to the second rail 130. Like reference numerals refer to like elements. For clarity, the catch-arm subassembly 400*a* will be discussed with reference to FIGS. 11-13.

Referring now to FIG. 11, there is illustrated a perspective view of the catch-arm subassembly 400*a* of the stacker/destacker assembly 20. FIG. 12 illustrates a first side view of the catch-arm subassembly 400*a*. FIG. 13 illustrates a second side view of the catch-arm subassembly 400*a*. The catch-arm subassembly 400*a*, 500*a* can be adjustably positioned along the longitudinal length of rail 120. Likewise, catch-arm subassembly 400*b*, 500*b* can be adjustably positioned along the longitudinal length of rail 130. The type of connection arrangement used to enable one or more of the catch-arm subassemblies to be adjustably positioned along the longitudinal length of rail 120 or rail 130 is non-limiting (e.g., slot arrangement, rail arrangement, groove arrangement, slidable bracket, plurality of slots or holes, pin, bolt, clamp, electromagnet, screw, etc.).

The catch-arm subassembly 400*a* includes a slidable bracket 410*a*, and an arm support 420*a* having a first guide 450*a*. The slidable bracket 410*a* includes a sensor 430*a*, a catch 440*a* that is mechanically operable (e.g., manually and/or electronically controlled) to extend and retract, and a second guide 460*a*, wherein the second guide 460*a* includes a first portion 462*a* and a second portion 464*a*. The first portion 462*a* and the second portion 464*a* are configured to define a predetermined angle such as to correspond to and receive an edge or corner of the desired tray. As can be appreciated, first portion 462*a* and the second portion 464*a* can optionally be configured to be adjustable to accommodate different angled and/or different shaped trays.

The first guide 450*a* and the second guide 460*a* are configured to stabilize and guide the stack of trays as each tray is destacked in the destacking portion 50*a*. The sensor 430*a* can be any type of sensing device (e.g., camera, infrared sensor, contact sensor, ultrasonic sensor, ultra-wide band bandwidth sensor, ultrasound sensor, RFID sensor, laser sensor, etc.) configured to detect the presence of a tray in the destacking portion 50*a*, determine the position of a tray in the destacking portion 50*a* and/or to determine the displacement of the trays in the first lift subassembly 200. In the present non-limiting embodiment, the predetermined angle is 90°; however, it is to be understood that this angle is non-limiting and that that other orientation angles (e.g., 5°-175° and all values and ranges therebetween) could be used depending on the shape and dimensions of the tray corners. As also can be appreciated, the shape formed by the first portion 462*a* and a second portion 464*a* can optionally be curved, multi-angled, etc. to accommodate different shaped trays.

Figure 14:
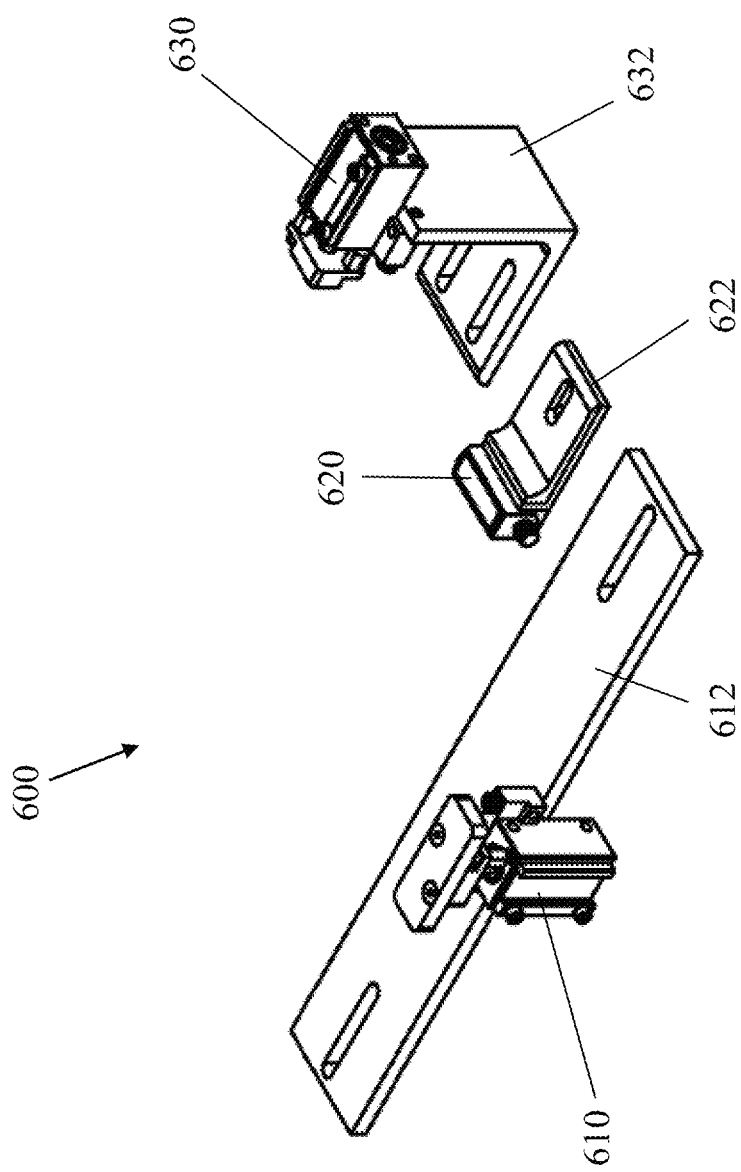
FIG. 14 is a perspective view of a non-limiting stop-and-crowd work subassembly of the adjustable stacker/destacker assembly of FIG. 2.
Figure 15:
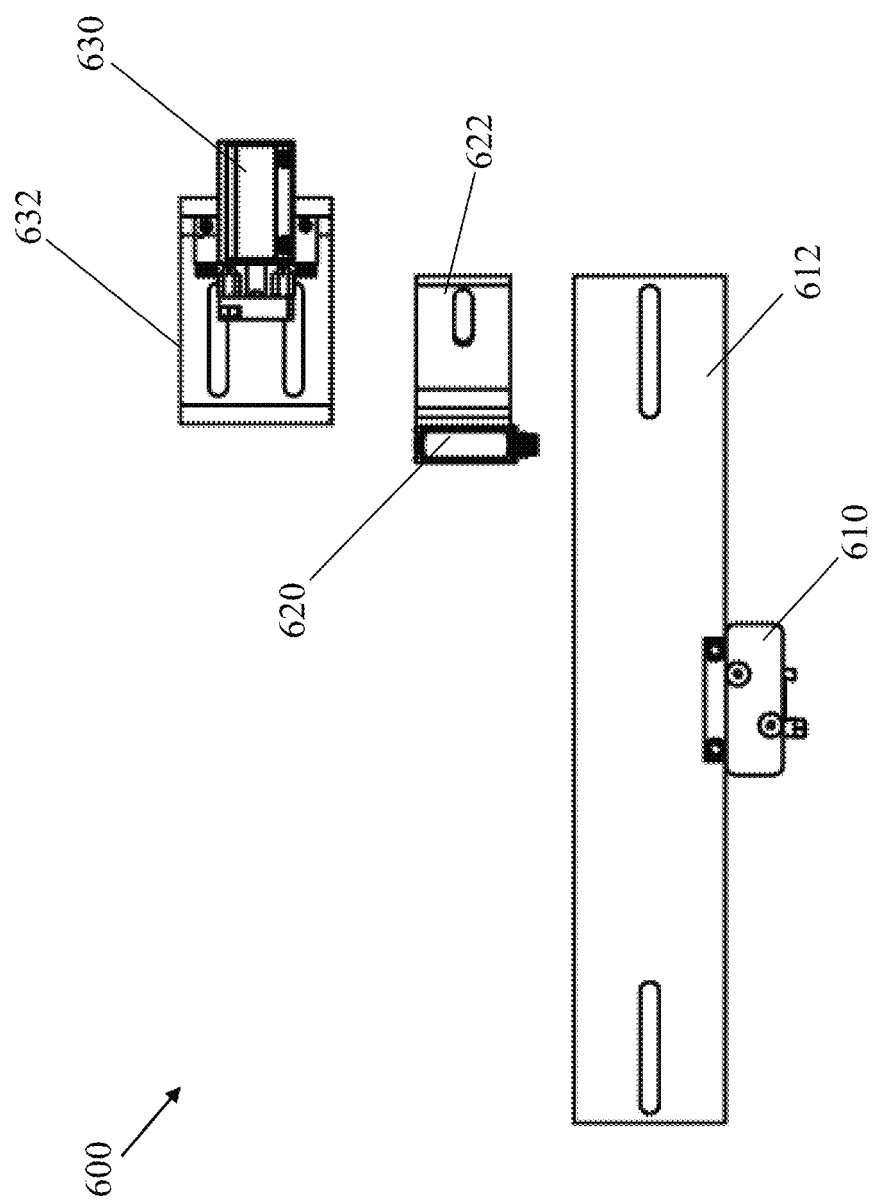
FIG. 15 is a top-down view of the stop-and-crowd work subassembly of FIG. 14.

Referring now to FIG. 14, there is illustrated a perspective view of the exemplary stop-and-crowd work subassembly 600 of the adjustable stacker/destacker assembly 20 in the unassembled configuration. FIG. 15 illustrates a top-down view of stop-and-crowd work subassembly 600. The stop-and-crowd work subassembly 600 includes a stop 610 that is coupled to an adjustable width bracket 612. The adjustable width bracket 612 can include one or more slots and/or other arrangement to enable the stop-and-crowd work subassembly 600 to be adjustably positioned on the adjustable stacker/destacker assembly 20. A sensor 620 is coupled to a bracket 622. A crowder 630 is coupled to a bracket 632. Each of the components of the stop-and-crowd work subassembly 600 cooperate together to allow for secondary processing (i.e., removing, loading, inspecting, analyzing, labeling, and/or shaking tray items manually and/or via robotics and/or other electronic arrangements) before the destacked trays 10 enter the stacker portion 50*b*. The sensor 620 can be any sensing device (e.g., camera, infrared sensor, contact sensor, ultrasonic sensor, ultra-wide band bandwidth sensor, ultrasound sensor, RFID sensor, laser sensor, etc.) that determines if a tray is present in the stop-and-crowd work area. If the sensor 620 determines a tray is present, the stop 610 can be configured to halt the tray at a predetermine location, and the crowder 630 locks the tray in place while any secondary processing is occurring. In some non-limiting embodiments, the crowder 630 removes any tolerance gap in the conveyor width.

Referring again to FIGS. 1-17, the first lift subassembly 200, the second lift subassembly 300, and the stop 610 of the stop-and-crowd work subassembly 600 are each coupled to the conveyor 100 via the adjustable width brackets 225, 325, 612, respectively. As can be appreciated, the first lift subassembly 200, the second lift subassembly 300, and/or the stop 610 of the stop-and-crowd work subassembly 600 can be adjustable coupled to the conveyor 100 using other or additional arrangements (e.g., slot arrangement, rail arrangement, groove arrangement, slidable bracket, plurality of slots or holes, pin, bolt, clamp, electromagnet, screw, ratchet arrangement, electromagnetic lock, electronic clamp, pin, adjustable clamping arrangement, electro-magnetic coupling arrangement, bolt arrangement, etc.). Each of the adjustable width brackets 225, 325, 612 are slidably coupled to the bottom sides 124, 134 of the first and second rails 120, 130, transverse to the length of the conveyor 100. The first and second rails 120, 130 are moveable along each of the adjustable width brackets 225, 325, 612 to adjust the conveyor 100 to a predetermined width that corresponds to that of the trays 10. Once the predetermined width is obtained, the first and second rails 120, 130 can be locked or securely fastened at the adjusted, predetermined width to prevent unwanted movement. The catch-arm subassemblies 400*a*, 500*a* are each slidably mounted on the outer portion 126 of the first rail 120; and the catch-arm subassemblies 400*b*, 500*b* are each slidably mounted on the outer portion 136 of the second rail 130. In the destacking portion 50*a*, the catch-arm subassemblies 400*a*, 400*b* each slide along the lengths of their respective rails 120, 130 until the position of both subassemblies 400*a*, 400*b* define the predetermined shape and dimensions of the trays. In the stacker portion 50*b*, the catch-arm subassemblies 500*a*, 500*b* each slide along the lengths of their respective rails 120, 130 until the position of both subassemblies 500*a*, 500*b* define the predetermined shape and dimensions of the trays. Once the predetermined tray shape and dimensions are obtained, the subassemblies 400*a*, 400*b*, 500*a*, and 500*b* can be locked or securely fastened at the adjusted, predetermined shape and dimensions to prevent unwanted movement.

Figure 16:
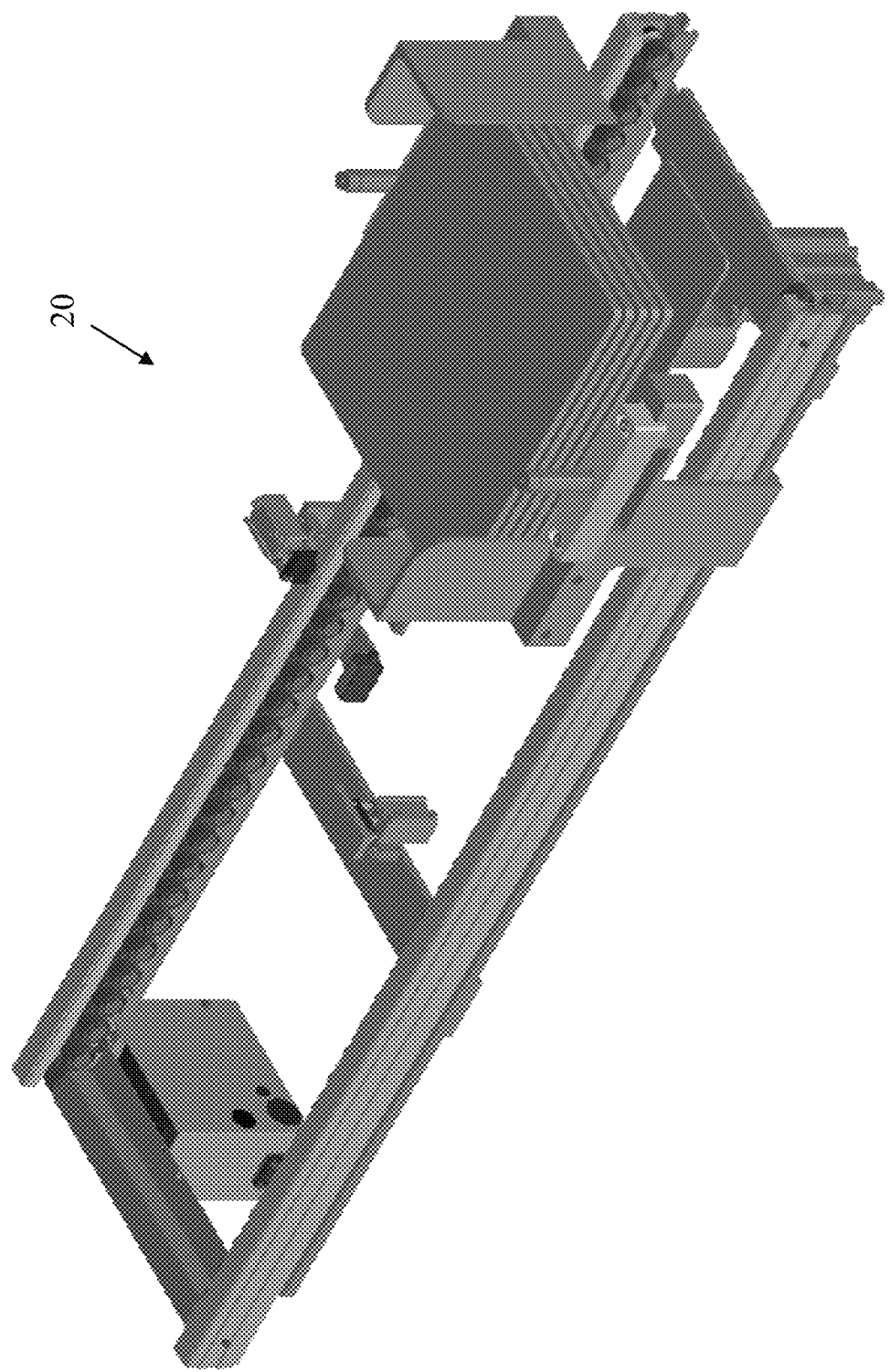
FIG. 16 is a perspective view of a modified adjustable stacker/destacker assembly in a completely assembled configuration in accordance with the present disclosure.

Once the components of the stacker/destacker assembly 20 have been adjusted to their predetermined sizes and dimensions, the stack of trays 5 can be loaded in the destacker portion 50*a* as illustrated in FIG. 16 such that the second guides 460*a*, 460*b* of the subassemblies 400*a*, 400*b* receive and guide opposite corners of the trays 10, and the stack of trays 5 rest on the catches 440*a*, 440*b*. To destack the trays, (i) the lift plate 205 lifts the stack of trays 5 above the catches 440*a*, 440*b*; (ii) the catches 440*a*, 440*b* are retracted; (iii) the lift plate 205 lowers the stack of trays 5 until the bottom most tray is positioned below the catches 440*a*, 440*b*; (iv) the catches 440*a*, 440*b* are extended; and (v) the lift plate 205 further lowers the stack of trays 5 so that the second bottom most tray rests on the catches 440*a*, 440*b* and the bottom most tray is sent along the conveyor 100 to the stop-and-work subassembly 600. The destacking process is repeated until the desired number of trays are destacked.

After passing through the stop-and-work subassembly 600, the destacked trays 10 enter the stacking portion 50*b*. To stack the trays, (i) the lift plate 305 receives and lifts the tray 10 from the conveyor 100, pushing through and over the catches 540*a*, 540*b*; and (ii) the lift plate 305 lowers and places the tray 10 on the catches 540*a*, 540*b*. The stacking process is repeated until the desired number of trays are stacked.

In one non-limiting method for destacking and stacking a set of trays 10 using the disclosed adjustable stacker/destacker assembly 20 illustrated in FIGS. 1-17, the following steps are performed: (i) adjusting the conveyor 100, manually or electronically, to correspond to a predetermined size and dimensions of the stack of trays 5; (ii) adjusting the first and second set of arms 230, 235 on the first lift subassembly 200 and the first and second set of arms 330, 335 on the second lift subassembly 300, manually or electronically, to correspond to the stack of trays 5; (iii) adjusting the catch arm subassemblies 400*a*, 400*b*, 500*a*, and 500*b*, manually or electronically, to correspond to the stack of trays 5; (iv) providing the stack of trays 5 in the destacker portion 50*b*; (v) through the first lift subassembly 200, destacking each of the trays 10 individually; (vi) through the stop-and-crowd work subassembly 600, receiving each of the destacked trays 10 for secondary processing; (vii) sending each of the destacked trays 10 to the stacker portion 50*b*; and (viii) through the second lift subassembly 300, restacking each of the trays 10 individually. It is to be understood that the disclosed method can be used to stack a set of trays, destack a set of trays, or both stack and destack a set of trays.

It will be appreciated that the adjusting of the conveyor 100 can include manual or electronically controlled securing arrangements that are used to a) lock or otherwise secure the securing arrangements so as to maintain the width of the conveyor during the operation of the adjustable stacker/destacker assembly 20, and b) unlock or otherwise unsecure the securing arrangements so as to enable the width of the conveyor to be adjusted prior to the operation of the adjustable stacker/destacker assembly 20. The type of securing arrangement is not limited (e.g., bolt, clamp, screw, ratchet arrangement, electromagnetic lock, electronic clamp, etc.). It will be appreciated that the adjusting of the first and second set of arms 230, 235 on the first lift subassembly 200 and/or the first and second set of arms 330, 335 on the second lift subassembly 300 can include manual or electronically controlled securing arrangements that are used to a) lock or otherwise secure the securing arrangements so as to maintain the relative position of the first and second set of arms 230, 235 on the first lift subassembly 200 and/or the first and second set of arms 330, 335 on the second lift subassembly 300, and b) unlock or otherwise unsecure the securing arrangements so as to enable the positioned of the first and second set of arms 230, 235 on the first lift subassembly 200 to be adjusted and/or the first and second set of arms 330, 335 on the second lift subassembly 300 to be adjusted. The type of securing arrangement is not limited (e.g., bolt, clamp, screw, ratchet arrangement, electromagnetic lock, electronic clamp, etc.). It will be appreciated that the adjusting of the adjusting the catch arm subassemblies 400*a*, 400*b*, 500*a*, and 500*b* can include manual or electronically controlled securing arrangements that are used to a) lock or otherwise secure the securing arrangements so as to maintain the relative position of the catch arm subassemblies 400*a*, 400*b* and/or the catch arm subassemblies 500*a*, 500*b*, and b) unlock or otherwise unsecure the securing arrangements so as to enable the positioned of the catch arm subassemblies 400*a*, 400*b* and/or the catch arm subassemblies 500*a*, 500*b* to be adjusted.

It will be appreciated that any of a variety of additional or alternative steps may be included in a method of using adjustable stacker/destacker assembly 20.

It will be appreciated that the stop-and-crowd work subassembly 600 can optionally be excluded from the adjustable stacker/destacker assembly 20 based on the level of precision desired. In non-limiting embodiments where the stop-and-crowd work subassembly 600 is excluded: (i) trays could be removed from the conveyor 100 by picking from roughly the center point of the conveyor 100; and/or (ii) a robot with vision capability or additional locating capability could "find" the precise location of the trays known to be within a crude, predetermined range.

In certain non-limiting embodiments, the assembly 20 and its components can be controlled by one or more of a programmable logic controller (PLC), a human machine interface (HMI), a "smart" conveyor motor with I/O functionality, a robot controller with custom programming, or a dedicated controller application as an add-on to a robot controller. Suitable adjustable-width roller conveyors can be available from Quickdraw® conveyor systems or belt conveyors provided by Automation, Inc. It will be appreciated, however, that any of the components described herein could be used with any of a variety of suitable conveyors, conveyance systems, or guide tracks with mechanical conveyance.

A computer system in accordance with the present disclosure can be accessed via any suitable technique, such as a web-browser, smart device app, smart phone app, computer, tablet, server, cloud, etc. In some embodiments, the systems and methods described herein can be a web-based application or a stand-alone executable. Additionally, in some embodiments, the systems and methods described herein can integrate with other systems of various types. Any suitable device can be used to access, or execute, one or more portions of the systems for warning a vehicle operator, such as laptop computers, desktop computers, smart phones, tablet computers, and the like.

Interaction with the detection system and/or the receiving device can be possible and may include, without limitation, keyboard entry, writing from pen, stylus, finger, or the like, with a computer mouse, or other forms of input (voice recognition, etc.). A user, e.g., vehicle operator or passenger, may receive real-time feedback, or at least near real-time feedback, or may synchronize with the detection system and/or the receiving device at a later date.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the systems and methods described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the systems and methods described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semipermanent, and/or semitemporary.

It will thus be seen that the objects set forth above, among those made apparent from the preceding description, are efficiently attained, and since certain changes may be made in the constructions set forth without departing from the spirit and scope of the disclosure, it is intended that all matter contained in the above description and shown in the accompanying drawings shall be interpreted as illustrative and not in a limiting sense. The disclosure has been described with reference to preferred and alternate embodiments. Modifications and alterations will become apparent to those skilled in the art upon reading and understanding the detailed discussion of the disclosure provided herein. This disclosure is intended to include all such modifications and alterations insofar as they come within the scope of the present disclosure. It is also to be understood that the following claims are intended to cover all of the generic and specific features of the disclosure herein described and all statements of the scope of the disclosure, which, as a matter of language, might be said to fall there between. These and other modifications of the preferred embodiments as well as other embodiments of the disclosure will be obvious from the disclosure herein, whereby the foregoing descriptive matter is to be interpreted merely as illustrative of the disclosure and not as a limitation. It is intended to include all such modifications and alterations insofar as they come within the scope of the appended claims.

The description of embodiments and examples has been presented for purposes of illustration and description. It is not intended to be exhaustive or limiting to the forms described. Numerous modifications are possible in light of the teachings herein. Some of those modifications have been discussed, and others will be understood by those skilled in the art. The embodiments were chosen and described in order to illustrate principles of various embodiments as are suited to particular uses contemplated. The scope is, of course, not limited to the examples set forth herein, but can be employed in any number of applications and equivalent devices by those of ordinary skill in the art.

To aid the Patent Office and any readers of this application and any resulting patent in interpreting the claims appended hereto, applicants do not intend any of the appended claims or claim elements to invoke 35 U.S.C. 112(f) unless the words "means for" or "step for" are explicitly used in the particular claim.

What is claimed:

1. A tray stacking assembly comprising:
   (a) a conveyor having a first rail and a second rail;
   (b) a lift subassembly that is configured to stack or destack a plurality of trays having predetermined dimensions; said lift subassembly includes:
      (i) a first set of arms that are slidably coupled to a lift plate;
      (ii) a second set of arms that are slidably coupled to said lift plate; and
      (iii) a bracket that is configured to slidably couple said lift subassembly to said first rail and said second rail; and
   wherein said first and/or second rails are adjustable along said bracket of said lift subassembly to correspond to said predetermined dimensions of said plurality of trays; and
   wherein each of said first and second sets of arms are independently adjustable to correspond to said predetermined dimensions of said plurality of trays.

2. The tray stacking assembly as defined in claim 1, further comprising a second lift subassembly configured to stack and/or destack said plurality of trays; said second lift subassembly includes:
   (a) a first set of arms that are slidably coupled to a lift plate;
   (b) a second set of arms that are slidably coupled to said lift plate; and
   (c) a bracket that is configured to slidably couple said second lift subassembly to said first rail and said second rail.

3. The tray stacking assembly as defined in claim 2, wherein said first and/or second rails are adjustable along said bracket of said second lift subassembly to correspond to said predetermined dimensions of said plurality of trays; each of said first and second sets of arms of said second lift subassembly are independently adjustable to correspond to said predetermined dimensions of said plurality of trays.

4. The tray stacking assembly as defined in claim 1, further including:
   (a) a first catch-arm subassembly that is slidably coupled to said first rail; said first catch-arm subassembly comprising:
      (i) a first catch; and
      (ii) a first guide member; and
   (b) a second catch-arm subassembly that is slidably coupled to said second rail; said second catch-arm subassembly includes:
      (i) a second catch; and
      (ii) a second guide member, and
   wherein said first catch-arm subassembly is adjustable along a length of said first rail; and
   wherein said second catch-arm subassembly is adjustable along a length of said second rail.

5. The tray stacking assembly as defined in claim 4, wherein
   (a) said first guide member of said first catch-arm subassembly includes a first portion and a second portion that is configured at an angle to receive a first edge of said plurality of trays; and
   (b) said second guide member of said second catch-arm subassembly includes a first portion and a second portion that is configured at a second angle to receive a second edge of said plurality of trays.

6. The tray stacking assembly as defined in claim 4, wherein said first and second catch-arm subassemblies are configured to correspond to said lift subassembly.

7. The tray stacking assembly as defined in claim 2, further comprising:
   (a) a third catch-arm subassembly that is slidably coupled to said first rail; said third catch-arm subassembly includes:
      (i) a third catch; and
      (ii) a third guide member, and
   (b) a fourth catch-arm subassembly that is slidably coupled to said second rail; said four catch-arm subassembly includes:
      (i) a fourth catch; and
      (ii) a fourth guide member, and
   wherein said third and fourth catch-arm subassemblies are configured to correspond to said second lift subassembly.

8. The tray stacking assembly as defined in claim 1, further including a stop-and-crowd subassembly; said stop-and-crowd subassembly includes:
   (a) a bracket that is slidably coupled to said first and second rails; said bracket includes at least one stop device that is configured to stop each of said plurality of trays at a predetermined location on said conveyor; and
   (b) a crowder that is configured to secure each of said plurality of trays at said predetermined location; and
   (c) a sensor that is communicatively coupled to said at least one stop device and said crowder.

9. The tray stacking assembly as defined in claim 1, wherein each of said first and second set of arms of said lift subassembly include a slot that receives a pin to enable position adjustment of said first and second set of arms on said lift plate.

10. The tray stacking assembly as defined in claim 1, wherein said first set of arms of said lift subassembly extend in opposite directions.

11. A tray stacking and destacking assembly, comprising:
   (a) a conveyor having a first rail and a second rail;
   (b) a first lift subassembly that is configured to destack a plurality of trays having predetermined dimensions; said first lift subassembly includes:
      (i) a first set of arms that is slidably coupled to a first lift plate;
      (ii) a second set of arms that is slidably coupled to said first lift plate; and
      (iii) a bracket that is configured to slidably couple said first lift subassembly to said first rail and said second rail; and
   (c) a second lift subassembly that is configured to stack said plurality of trays; said second lift subassembly includes:
      (i) a first set of arms that is slidably coupled to a second lift plate;
      (ii) a second set of arms that is slidably coupled to said second lift plate; and
      (iii) a bracket that is configured to slidably couple said second lift subassembly to said first rail and said second rail; and
   wherein said first and/or second rails are adjustable along said bracket of said first lift subassembly and said bracket of said second lift subassembly to correspond to said predetermined dimensions of said plurality of trays; and
   wherein each of said first and second arms of said first lift subassembly and said first and second arms of said second lift subassembly are independently adjustable to correspond to said predetermined dimensions of said plurality of trays.

12. The tray stacking and destacking assembly as defined in claim 11, further comprising:
   (a) a first catch-arm subassembly that is slidably coupled to said first rail; said first catch-arm subassembly includes:
      (i) a first catch; and
      (ii) a first guide member; and
   (b) a second catch-arm subassembly that is slidably coupled to said second rail; said second catch-arm subassembly includes:
      (i) a second catch; and
      (ii) a second guide member; and
   wherein said first catch-arm subassembly is adjustable along a length of said first rail; and
   wherein said second catch-arm subassembly is adjustable along a length of said second rail.

13. The tray stacking and destacking assembly as defined in claim 12, wherein
   (a) said guide member of said first catch-arm subassembly includes a first portion and a second portion that is configured at a predetermined angle to receive a first edge of said plurality of trays; and
   (b) said guide member of said second catch-arm subassembly includes a first portion and a second portion configured at a second predetermined angle to receive a second edge of said plurality of trays.

14. The tray stacking and destacking assembly as defined in claim 12, wherein said first and second catch-arm subassemblies are configured to correspond to said first lift subassembly.

15. The tray stacking and destacking assembly as defined in claim 11, further comprising:
   (a) a third catch-arm subassembly that is slidably coupled to said first rail; said third catch-arm subassembly includes:
      (i) a third catch; and
      (ii) a third guide member, and
   (b) a fourth catch-arm subassembly that is slidably coupled to said second rail; said four catch-arm subassembly includes:
      (i) a fourth catch; and
      (ii) a fourth guide member; and
   wherein said third and fourth catch-arm subassemblies are configured to correspond to said second lift subassembly.

16. The tray stacking and destacking assembly as defined in claim 11, further comprising:
   (a) a bracket slidably that is coupled to said first and second rails; said bracket includes at least one stop device that is configured to stop each of said plurality of trays at a predetermined location on said conveyor; and
   (b) a crowder that is configured to secure each of said plurality of trays at said predetermined location; and
   (c) a sensor that is communicatively coupled to said at least one stop device and said crowder.

17. The tray stacking and destacking assembly as defined in claim 11, wherein each of said first and second set of arms of said first lift subassembly include a slot that receives a pin to positionably adjust said first and second set of arms on said first lift plate.

18. The tray stacking and destacking assembly as defined in claim 11, wherein each of said first and second set of arms of said second lift subassembly include a slot that receives a pin to positionably adjust said first and second set of arms on said second lift plate.

19. The tray stacking and destacking assembly as defined in claim 11, wherein
   (a) said first set of arms of said first lift subassembly extend in opposite directions; and
   (b) said first set of arms of said second lift subassembly extend in opposite directions.

20. A tray stacking assembly comprising:
   (a) a lift plate that is configured to be readily adapted to receive a plurality of trays having predetermined dimensions for stacking or destacking; said lift plate comprising:
      (i) a first set of arms that are slidably coupled to a top surface of said lift plate;
      (ii) a second set of arms that are slidably coupled to said top surface of said lift plate;

wherein each of said first and second sets of arms are independently adjustable to correspond to said predetermined dimensions of said plurality of trays;

(b) an adjustable width conveyor that has a first rail and a second rail; said lift plate is disposed between said first and second rails; and (c) a catch-arm subassembly that is configured to aid in said stacking or destacking of said plurality of trays on said lift plate; said catch-arm subassembly is slidably coupled to and adjustable along said first rail or said second rail.

\* \* \* \* \*